United States Patent
Taniguchi et al.

(10) Patent No.: US 7,898,434 B2
(45) Date of Patent: Mar. 1, 2011

(54) DISPLAY SYSTEM AND PROGRAM

(75) Inventors: Kazuhiro Taniguchi, Kariya (JP);
Takao Kawai, Anjo (JP); Shigeru Kajioka, Kariya (JP)

(73) Assignee: Denso Corporation, Kariya (JP)

( * ) Notice: Subject to any disclaimer, the term of this patent is extended or adjusted under 35 U.S.C. 154(b) by 355 days.

(21) Appl. No.: 12/155,491

(22) Filed: Jun. 5, 2008

(65) Prior Publication Data

US 2009/0009314 A1    Jan. 8, 2009

(30) Foreign Application Priority Data

Jun. 15, 2007    (JP)   ............. 2007-158788

(51) Int. Cl.
*G08G 1/17*    (2006.01)
(52) U.S. Cl. .............. 340/937; 348/148; 348/149; 353/13; 382/104; 434/69; 701/1; 701/36
(58) Field of Classification Search ......... 340/435, 340/436, 903, 936, 937; 701/1, 36, 45; 382/103, 382/104; 348/148, 149; 434/69; 353/13; 180/271; 345/1.2, 7
See application file for complete search history.

(56) References Cited

U.S. PATENT DOCUMENTS

| | | | |
|---|---|---|---|
| 7,139,412 B2 | 11/2006 | Kato et al. | |
| 7,253,833 B2 | 8/2007 | Imoto | |
| 7,629,946 B2 * | 12/2009 | Nagata .................... | 345/7 |
| 2003/0090568 A1 * | 5/2003 | Pico ......................... | 348/148 |
| 2003/0090570 A1 * | 5/2003 | Takagi et al. ............. | 348/148 |
| 2003/0151563 A1 | 8/2003 | Kulas | |
| 2005/0143887 A1 | 6/2005 | Kinoshita | |
| 2005/0168695 A1 | 8/2005 | Ooba et al. | |
| 2006/0069478 A1 | 3/2006 | Iwama | |
| 2006/0115124 A1 * | 6/2006 | Nobori et al. ............ | 382/104 |
| 2006/0215020 A1 * | 9/2006 | Mori et al. ............... | 348/119 |
| 2007/0072154 A1 | 3/2007 | Akatsuka et al. | |
| 2007/0081262 A1 * | 4/2007 | Oizumi et al. ............ | 359/843 |

(Continued)

FOREIGN PATENT DOCUMENTS

JP    A-H10-217852    8/1998

(Continued)

OTHER PUBLICATIONS

Office Action dated Jan. 13, 2009 in corresponding JP application No. 2007-158788 (and English Translation).

(Continued)

*Primary Examiner*—Brent Swarthout
(74) *Attorney, Agent, or Firm*—Posz Law Group, PLC

(57) ABSTRACT

A display system and a program for displaying a portion of a range that is obstructed due to the body of a vehicle when viewed from a driver seat is provided. The portion of the range is seamlessly linked to a scene viewed through a windshield. The display system includes an imaging means acquiring an image of an outside of a vehicle including the obstructed portion of the range, a first display means disposed on an instrument panel of the vehicle, and a control means that processes an image acquired by the imaging means. The image displayed on the first display means is seamlessly linked to a scene viewed through the windshield and the processed image is displayed on the first display means.

9 Claims, 11 Drawing Sheets

U.S. PATENT DOCUMENTS

| | | |
|---|---|---|
| 2007/0120656 A1* | 5/2007 | Nakanishi et al. ............ 340/435 |
| 2007/0236363 A1 | 10/2007 | Hamada et al. |
| 2008/0062008 A1 | 3/2008 | Morimoto et al. |

FOREIGN PATENT DOCUMENTS

| | | |
|---|---|---|
| JP | A-2000-318554 | 11/2000 |
| JP | A-2002-354468 | 12/2002 |
| JP | A-2003-116125 | 4/2003 |
| JP | A-2003-235036 | 8/2003 |
| JP | A-2004-064131 | 2/2004 |
| JP | A-2004-274331 | 9/2004 |
| JP | A-2005-125828 | 5/2005 |
| JP | A-2005-182305 | 7/2005 |
| JP | A-2005-184225 | 7/2005 |
| JP | A-2005-284485 | 10/2005 |
| JP | A-2005-297762 | 10/2005 |
| JP | A-2006-74805 | 3/2006 |
| JP | A-2006-108988 | 4/2006 |
| JP | A-2006-157748 | 6/2006 |
| JP | A-2006-248384 | 9/2006 |

OTHER PUBLICATIONS

Notice of Reason for Refusal mailed on Mar. 17, 2009 issued from the Japanese Patent Office in the corresponding Japanese patent application No. 2007-158788 (and English translation).

First Office Action issued from the Chinese Patent Office on Oct. 23, 2009 in the corresponding Chinese patent application No. 200810125431.5 (with English translation).

Office Action dated Jul. 30, 2010 issued from the Chinese Patent Office in corresponding Chinese patent application No. 200810125431.5 (with English translation).

* cited by examiner

DISPLAY SYSTEM AND PROGRAM

CROSS REFERENCE TO RELATED APPLICATIONS

The present application is based on and claims priority to Japanese Application No. 2007-158788, filed Jun. 15, 2007, the entire contents of which are incorporated herein by reference.

FIELD OF THE INVENTION

The present invention relates to a display system and more particularly to a display system that displays a scene associated with an outside of a vehicle on a display means disposed in the vehicle.

BACKGROUND OF THE INVENTION

A range that a driver can directly discern from a driver seat is limited to an unobstructed visual range as viewed, for example, through a window glass and mirrors. A portion of the range that is hidden by a vehicle body, for example, in front of or behind the vehicle, cannot be directly discerned. A technology for displaying the portion of the range that the driver cannot directly discern on a display means disposed in the vehicle has been proposed. For example, a technology of displaying a scene behind a vehicle on a back guide monitor (BGM) of a car navigation system has been developed and is known.

Japanese Patent Application No. JP-A-2005-297762 describes a technology for displaying a version of an image on a display means disposed on a front pillar or a sun visor that would be viewed at a driver seat if a field-of-view hindrance member or obstruction were absent.

However, some disadvantages are present in that the BGM technology displays a scene behind a vehicle on the screen of the navigation system located in front of a driver seat. Therefore, the image displayed on the screen of the navigation system is disembodied and cannot be perceived or intuitively recognized as an integral part of an ambient scene. A driver has to consciously recognize that the image displayed on the screen of the navigation system is a scene from behind the vehicle.

Moreover, the technology in JP-A-2005-297762 can display only a very narrow range. For example, a range hidden by a front portion of a vehicle body cannot be displayed.

SUMMARY OF THE INVENTION

The present invention addresses the foregoing problems. An object of the present invention is to provide a display system and a program capable of displaying a range of a scene that is obstructed due to a body of a vehicle when viewed from a driver seat so that the obstructed portion of the range will be seamlessly linked to a scene that is viewed through a windshield.

In accordance with various embodiments, an image of the outside of a vehicle including a range that becomes obstructed due to a body or the like of the vehicle, as viewed, for example, from a driver seat in the vehicle, can be displayed on a first display means. Consequently, a driver can recognize an obstacle located in the blind spot and prevent contact or collision with the obstacle. The image displayed on the first display means is seamlessly linked to a scene viewed through a windshield. Namely, an entire scene that would be visible to a driver including the image displayed on the first display means supposing the vehicle did not exist is displayed on the first display means. A driver can more intuitively recognize the obstacle.

A state of a gear in a vehicle can be detected and the form of the display changed on the first display means from one to another according to the result of the detection. Consequently, appropriate display can be achieved on the first display means according to the state of the vehicle. For example, when the gear is shifted to a drive (D)-mode position, a scene in front of the vehicle is displayed. When the gear is shifted to a reverse (R)-mode position, a scene behind the vehicle is displayed. When the gear is shifted to a parking (P)-mode position, no display is provided.

The velocity of a vehicle can also be detected and the form of the display changed on the first display means from one to another according to the result of the detection. Consequently, appropriate display can be achieved on the first display means according to the velocity of the vehicle. For example, when the velocity falls below a predetermined value, a scene outside the vehicle is displayed on the first display means. When the velocity is greater than or equal to the predetermined value, no display is achieved.

The first display means can be used to give a notification if an obstacle lying in the area surrounding the vehicle is detected. Consequently, a driver can recognize the obstacle and prevent contact or collision with the obstacle.

A distance between a detected obstacle and a vehicle can be calculated and displayed on the first display means. Consequently, a driver can recognize the distance to the obstacle and prevent contact or collision with the obstacle.

Images to be displayed on the first display means can be switched between an image seamlessly linked to a scene viewed through a windshield and an image of a scene behind the vehicle. Consequently, a driver can recognize a situation evolving behind the vehicle.

An image that is seamlessly linked to a scene viewed through a side window can be displayed on a second display means disposed on part of the internal wall of a vehicle compartment adjacent to the side window. Namely, a scene that would be viewed at the position of the second display means supposing the vehicle did not exist can be displayed on the second display means. Consequently, a driver can recognize an obstacle located on a side of the vehicle, and prevent contact or collision with the obstacle. Moreover, since the display on the second display means is seamlessly linked to the scene viewed through the side window, the driver can more intuitively recognize the obstacle.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

Figure 1:
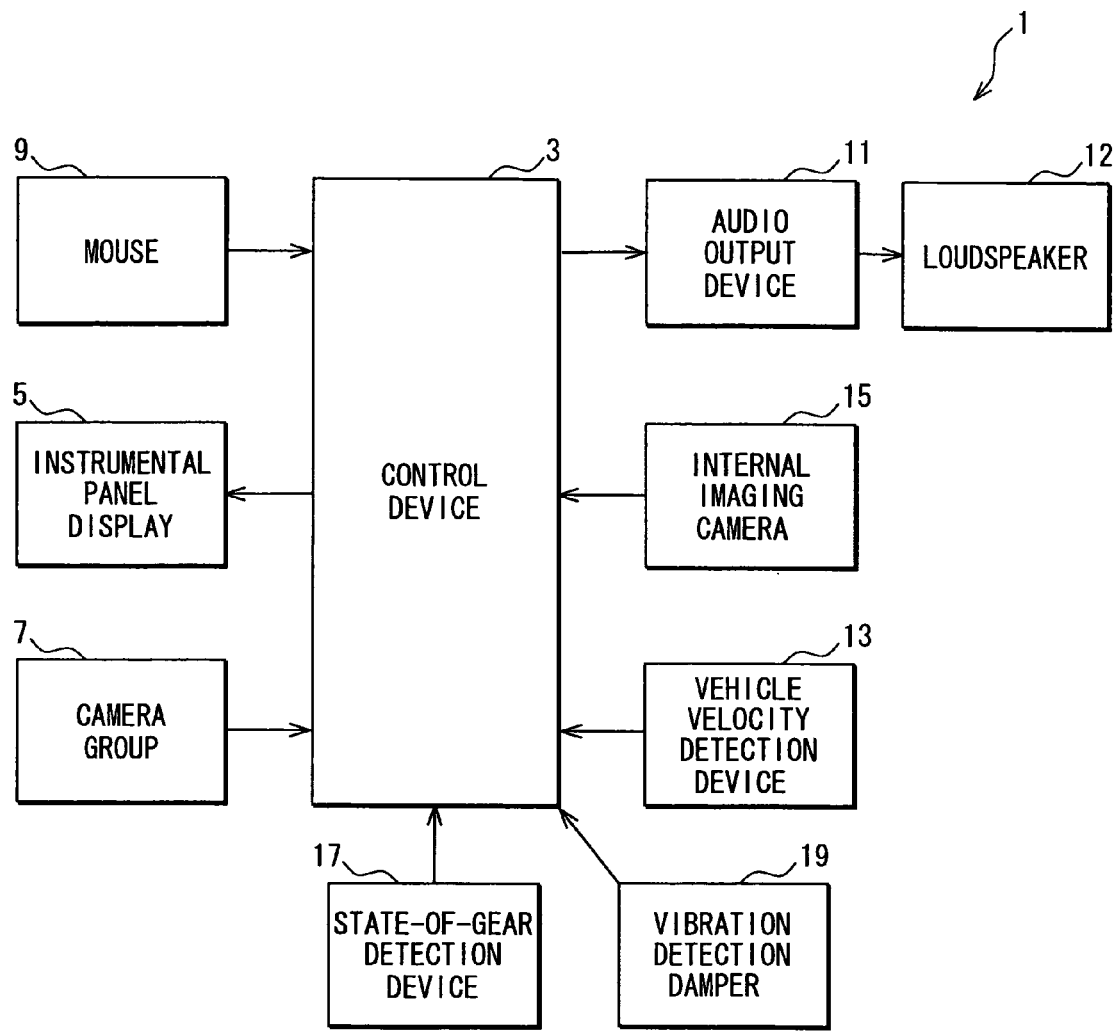
FIG. 1 is a block diagram illustrating a configuration of an exemplary display system.

Various embodiments will now be described below with reference to the drawings.

The configuration of a display system 1 will be described in conjunction with FIG. 1. The display system 1 can be applied to vehicles, and includes a control device 3 and other components connected to the control device 3. The components connected to the control device 3 include: an instrument panel display 5; a camera group 7 that captures an image of a scene outside a vehicle; a mouse 9 that can be used to input a desired instruction to the control device 3; an audio output device 11 that outputs sounds to a loudspeaker 12 disposed in a vehicle compartment; a vehicle velocity detection device 13 that detects the velocity of the vehicle; an internal imaging camera 15 that is disposed on the lower side of the roof of the vehicle and that can capture an image displayed on the instrument panel display 5 and a scene viewed through a windshield; a state-of-gear detection device 17 that detects the state of a gear in the vehicle, that is, whether the gear is shifted to a drive (D)-mode position, a parking (P)-mode position, or a reverse (R)-mode position; and a vibration detection damper 19 that detects the vibration of the vehicle. Incidentally, various meters are displayed on the instrument panel display 5. When the mouse 9 is used to input the positions of the meters to the control device 3, the positions of the various meters on the instrument panel display 5 can be changed to user-desired positions. Moreover, a program for executing processing that will be described later is stored in a memory unit (not shown) included in the control device 3. Alternatively, the program can be stored in an external memory or transferred to the control device 3 through a wired or wireless communication channel (not shown). Further, the control device 3, can be a controller, a processor, a programmable logic unit, or the like as will be appreciated. The control device 3 can operate as the control means as claimed herein.

Figure 2:
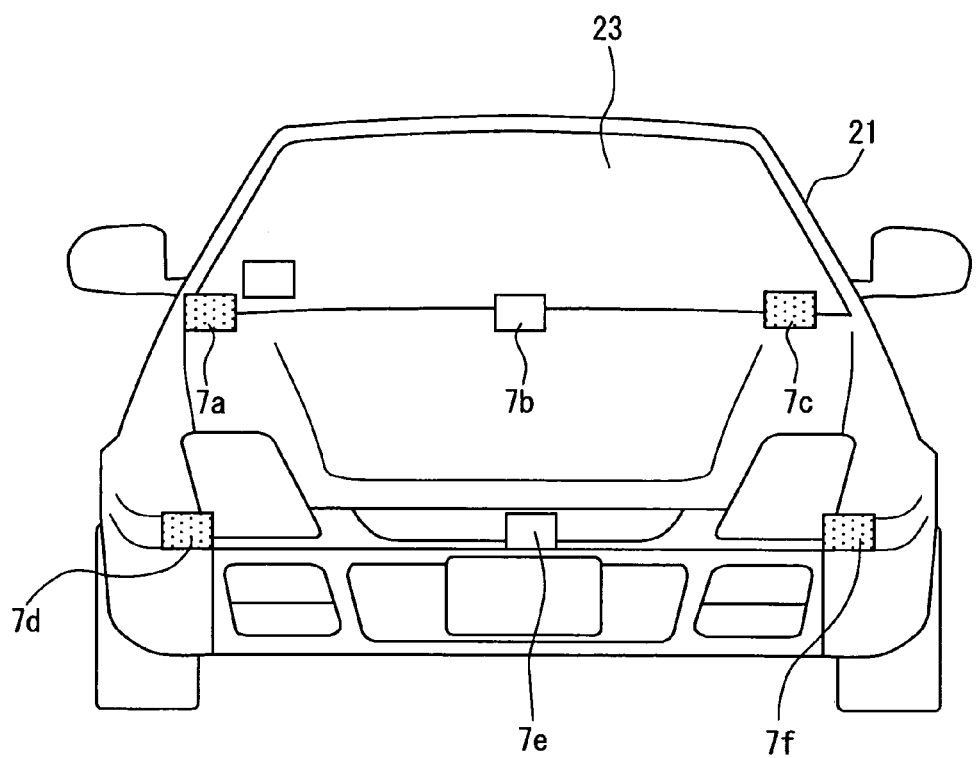
FIG. 2 is a diagram illustrating positions of exemplary cameras on a front of a vehicle.

The camera group 7 will be described in conjunction with FIG. 2 to FIG. 5. The camera group 7 includes, as shown in FIG. 2, cameras 7a to 7f attached to the front of the vehicle 21 and used to capture an image of a scene in front of the vehicle 21. The cameras 7a to 7c can be arranged with equidistant spacing on a line in a horizontal direction along the lower edge of a windshield 23. The cameras 7d to 7f can be arranged with equidistant spacing on a line in a horizontal direction along the front end of the vehicle 21.

Figure 3A:
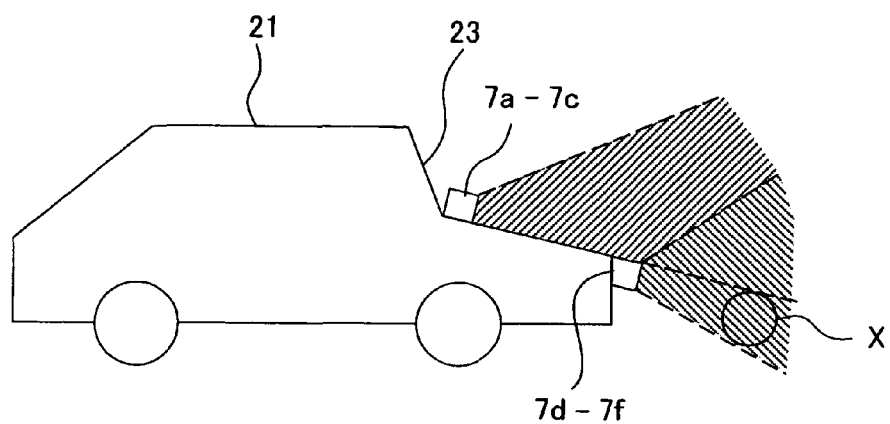
FIG. 3A is a diagram illustrating a side view of imaging ranges of the exemplary cameras disposed on the front of the vehicle.
Figure 3B:
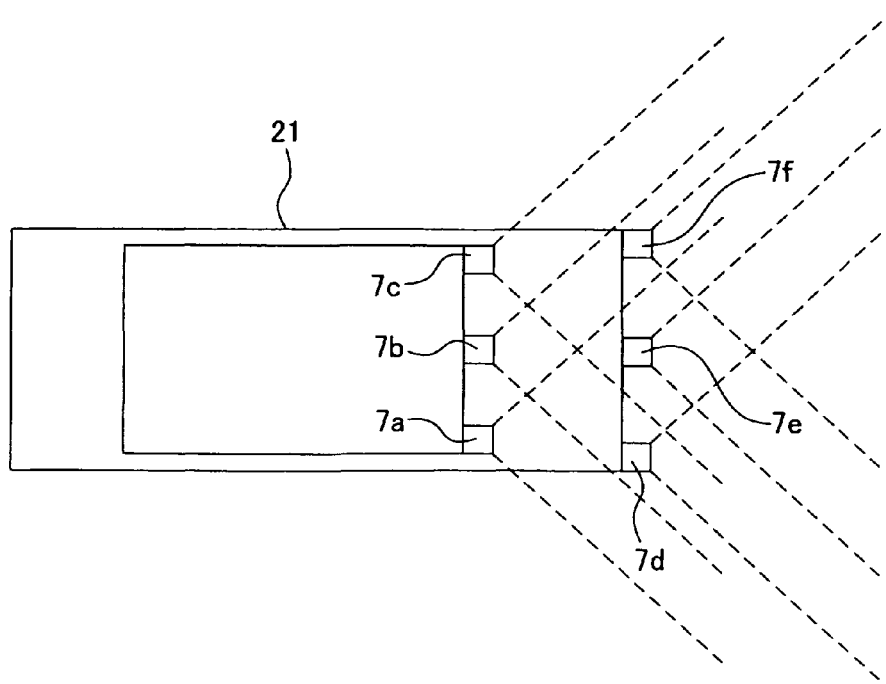
FIG. 3B is a diagram illustrating a top view of imaging ranges of the exemplary cameras disposed on the front of the vehicle.

FIG. 3A and FIG. 3B show ranges that can be captured by the cameras 7a to 7f. As shown in FIG. 3A, the ranges that can be captured by the cameras 7a to 7c can overlap with ranges that can be captured by the cameras 7d to 7f. As shown in FIG. 3B, the ranges that can be captured by the respective cameras 7a to 7c adjoin one another and overlap on respective sides thereof, and the ranges that can be captured by the respective cameras 7d to 7f adjoin one another and overlap on respective sides thereof. Consequently, a range that can be captured by all of the cameras 7a to 7f is a gapless wide range, and covers portions of the range the include a blind spot from the perspective of a driver in a driver seat in the vehicle 21, for example, an area X in FIG. 3A shaded by the body of the vehicle 21 when viewed from the perspective of the driver.

Figure 4A:
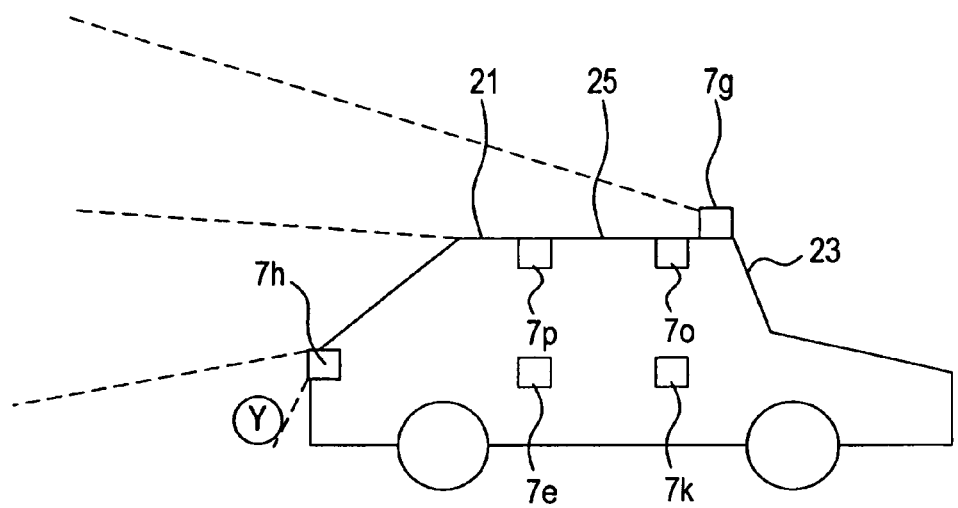
FIG. 4A is a diagram illustrating positions of exemplary cameras on the flanks and the back of the vehicle.
Figure 4B:
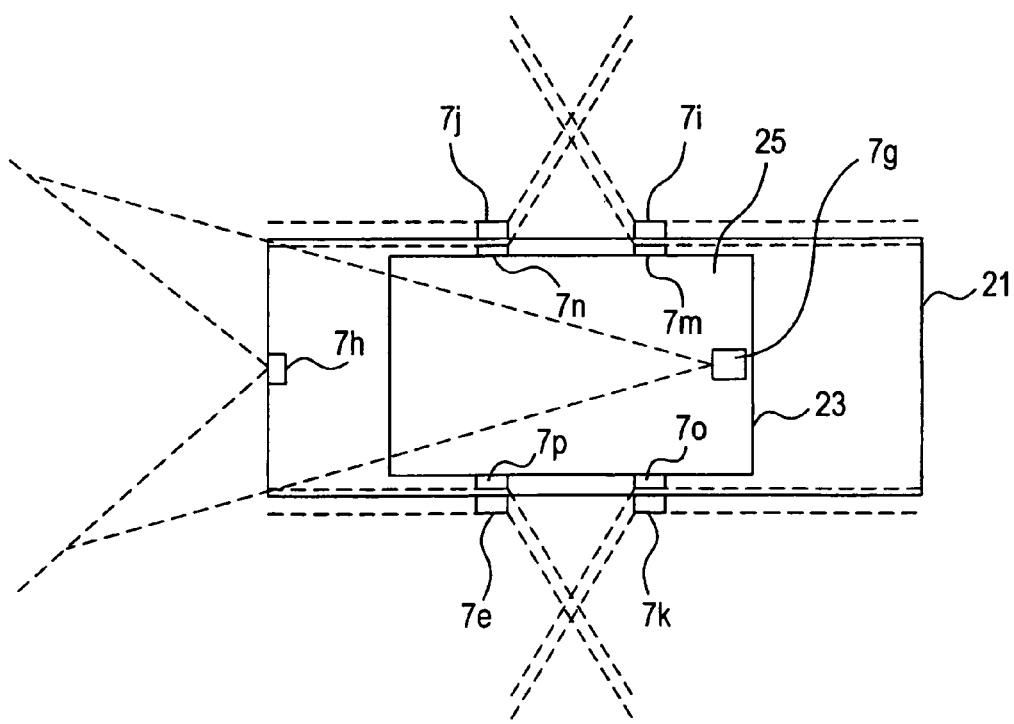
FIG. 4B is a diagram illustrating positions of exemplary cameras on the flanks and the back of the vehicle.

Moreover, the camera group 7 includes, as shown in FIG. 4A and FIG. 4B, cameras 7g and 7h that capture image ranges behind the vehicle 21. The camera 7g is disposed near the front edge of the upper side of the roof 25 of the vehicle 21, and the camera 7h is disposed at the rear end of the vehicle 21. A range that can be captured by both of the cameras 7g and 7h covers a range that is a blind spot for the driver at the driver seat in the vehicle 21, for example, an area Y in FIG. 4A shaded by the body of the vehicle 21 when viewed from the perspective of the driver.

Moreover, the camera group 7 includes, as shown in FIG. 4A and FIG. 4B, cameras 7i to 7p that image ranges on the lateral sides of the vehicle 21 and behind the vehicle 21. The cameras 7i and 7j are disposed on the lower part of the left flank of the vehicle 21, and the camera 7k and 7l are disposed on the lower part of the right flank of the vehicle 21. The cameras 7m and 7n are disposed near the upper edge of the left flank of the vehicle 21, and the cameras 7o and 7p are disposed near the upper edge of the right flank of the vehicle 21.

A range that can be captured by all of the cameras 7i, 7j, 7m, and 7n extends, as shown in FIG. 4B, in a gapless manner from a range in front of the vehicle 21 to a range behind the vehicle 21. Moreover, the imaging range covered by the cameras 7i and 7j disposed on the upper part of the flank overlaps the imaging range covered by the camera 7m and 7n disposed on the lower part thereof. Even in vertical directions, a wide range is covered.

A range that can be captured by all of the cameras 7k, 7l, 7o, and 7p extends, as shown in FIG. 4B, in a gapless manner from a range in front of the vehicle 21 to a range behind the vehicle 12. Moreover, the imaging range covered by the cameras 7o and 7p disposed on the upper part of the flank overlaps the imaging range covered by the cameras 7k and 7l disposed on the lower part thereof. Even in vertical directions, a wide range is covered.

Figure 5:
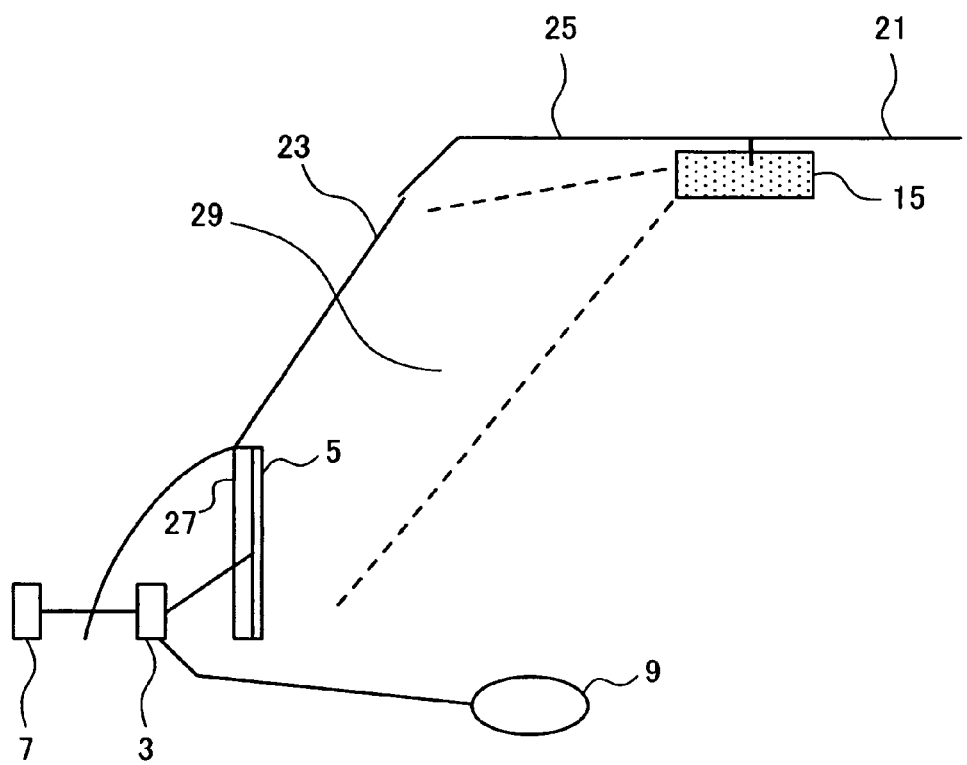
FIG. 5 is a diagram illustrating the arrangement of members, which are included in the display system 1, in the vehicle 21.
Figure 6:
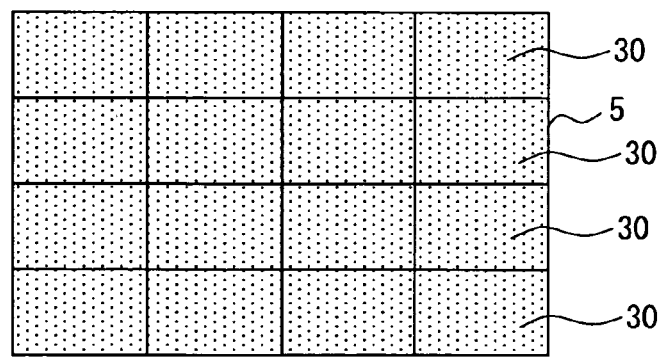
FIG. 6 is a diagram illustrating the construction of an exemplary instrument panel display.

Next, the arrangement in the vehicle 21 of other members included in the display system 1 will be described in conjunction with FIG. 5 and FIG. 6. An instrument panel display 5 is disposed to cover the entire surface of an instrument panel 27. The instrument panel display 5 is, as shown in FIG. 6, formed by joining multiple organic electroluminescent (EL) displays 30. The internal imaging camera 15 is disposed on the lower side of the roof 25, and can capture an image of a scene extending outside the vehicle 21 and is viewed through the windshield 23, and a range covering the instrument panel display 5. The control device 3 is disposed on the reverse side of the instrument panel 27, and the camera group 7 and mouse 9 are connected to the control device 3. The mouse 9 is disposed in a vehicle compartment 29 and can be manipulated by a driver.

Figure 7:
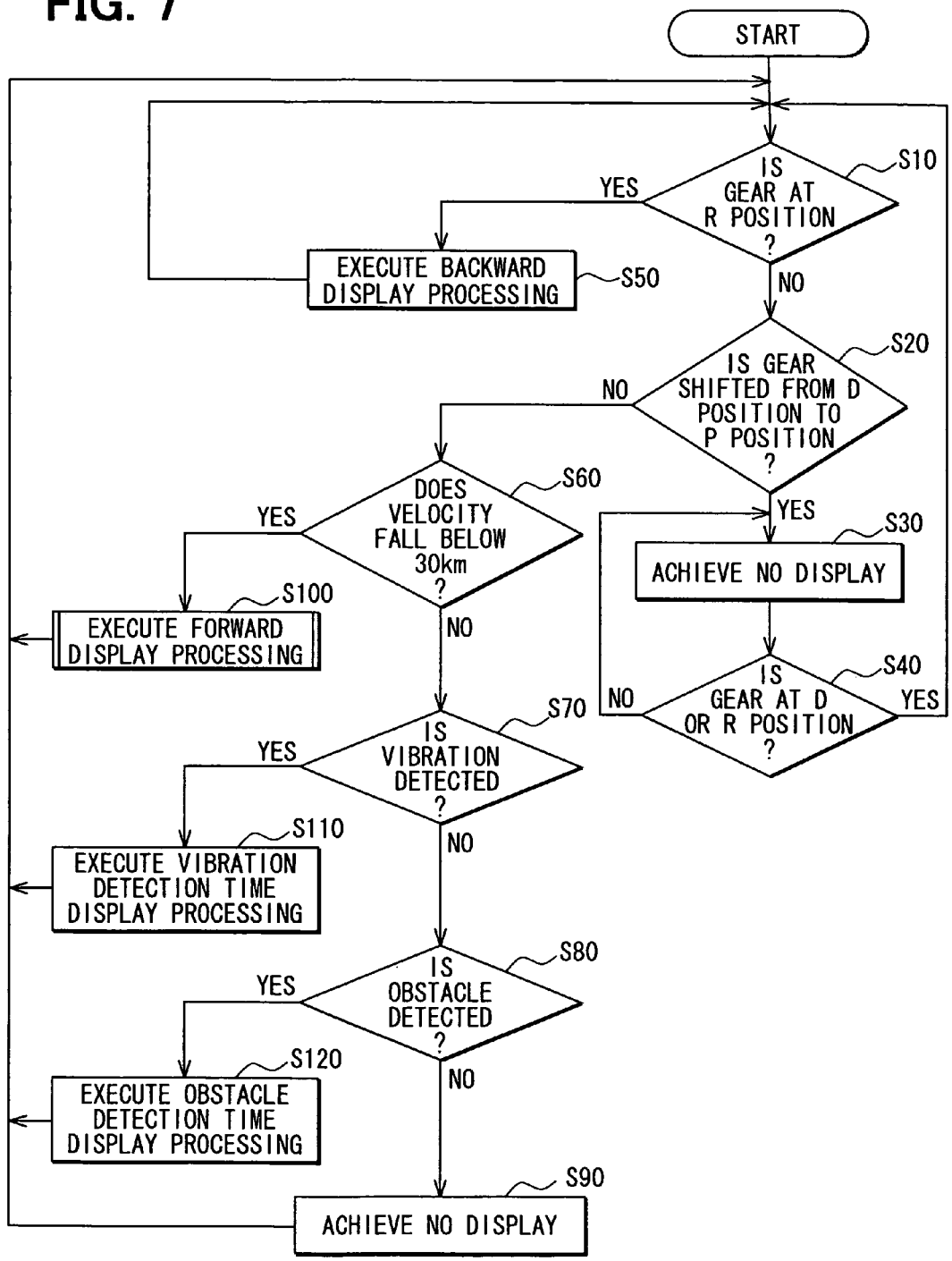
FIG. 7 is a flowchart illustrating exemplary processing to be executed by the display system.

Referring to the flowchart of FIG. 7, processing that can be executed by the display system 1, or more particularly, the control device 3 will be outlined below. The processing typically begins when the engine of the vehicle 21 is started.

At S10, a decision regarding whether the gear in the vehicle 21 is shifted to a reverse (R)-mode position is made. Only when the gear stays at the reverse-mode position for a certain time, for example, 2 sec or more, a decision is made that the gear is shifted to the reverse-mode position. Thus, even when the gear passes the reverse-mode position at the time of being shifted from one position to another, a decision is not made that the gear is shifted to the reverse-mode position. Consequently, frequent switching of the display will not take place. When a decision is made that the gear is not shifted to the reverse-mode position, corresponding to a NO at S10, control is passed to S20. On the other hand, when a decision is made that the gear is shifted to the reverse-mode position, corresponding to a YES at S10, control is passed to S50, and backward display processing is performed, which will be described in greater detail hereinafter.

At S20, a decision is made on whether a manipulation of shifting the gear of the vehicle 21 from a drive (D)-mode position to a parking (P)-mode position has been performed after the processing of the S20 is previously executed. When the manipulation has been performed, corresponding to YES at S20, control is passed to S30. When the manipulation has not been performed, corresponding to NO at S20, control is passed to S60.

Figure 8:
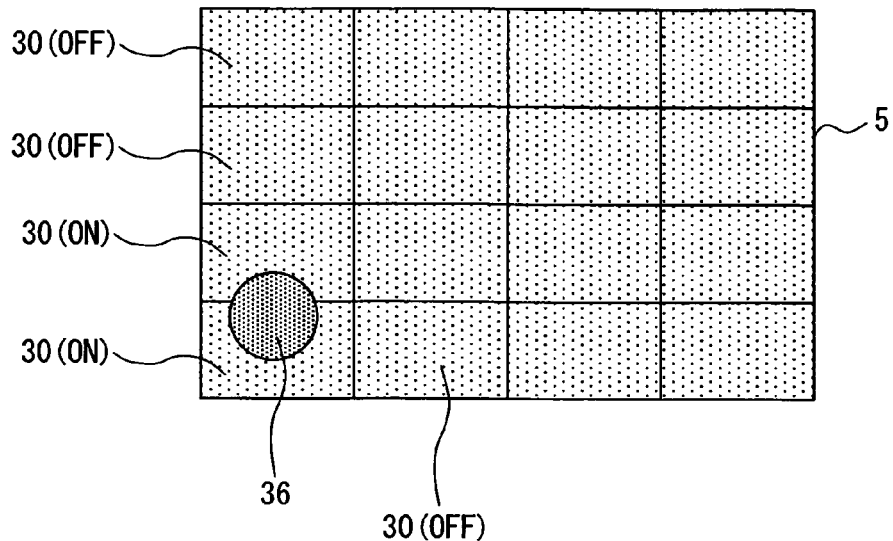
FIG. 8 is a diagram illustrating the instrument panel display placed in an exemplary no-display state.

At S30, a scene outside the vehicle 21 is not displayed on the instrument panel display 5. Instead, as shown in FIG. 8, a meter 36 alone is displayed on the instrument panel display 5. The instrument panel display 5 includes, as mentioned above, multiple organic electroluminescent displays 30. Only the organic electroluminescent display 30 on which the meter 36 is displayed is powered up, and the power supplies of the other organic electroluminescent displays 30 are turned off.

At S40, whether the gear is shifted to the drive (D)-mode position or reverse (R)-mode position is decided. When the gear is shifted to the drive-mode position or reverse-mode position, corresponding to YES at S40, control is passed to S10. When the gear is not shifted to the drive-mode position or the reverse-mode position, corresponding to NO at S40, control is passed to S30.

When control is passed to S60, for example when the manipulation has not been performed, corresponding to NO at S20, it is determined whether the velocity of the vehicle 21 falls below 30 km. When the velocity is greater than or equal to 30 km, corresponding to NO at S60, control is passed to S70. When the velocity falls below 30 km, corresponding to YES at S60, control is passed to S100.

At S70, it is determined whether the vibration detection damper 19 as shown for example, in FIG. 1, mounted in the vehicle 21 has detected a vibration of a predetermined value or more. When the damper has not detected any vibration, corresponding to NO at S70, control is passed to S80. When the damper has detected a vibration, corresponding to YES at S70, control is passed to S110.

At S80, it is determined whether an obstacle has been detected in a view acquired by the camera group 7. Detection of an obstacle is performed using an image acquired by the camera group 7 according to a known technology, for example, a technology disclosed in JP-A-2005-196276. When no obstacle has been detected, corresponding to NO at S80, control is passed to S90. When an obstacle has been detected, corresponding to YES at S80, control is passed to S120. At S90, a scene outside the vehicle 21 is not displayed on the instrument panel display 5. Thereafter, control is returned to S10.

When a decision is made at S60 that the velocity of the vehicle 21 falls below 30 km, corresponding to YES at S60, control is passed to S100, and forward display processing, to be described in greater detail hereinafter, is executed. Thereafter, control is returned to S10.

When a vibration is detected at S70, control is passed to S110, and vibration detection time display processing, which will be described in greater detail hereinafter, is executed. Thereafter, control is returned to S10.

When a vibration is detected at S80, control is passed to S120, and obstacle detection time display processing is executed. The obstacle detection time display processing will be described later. Thereafter, control is returned to S10.

Figure 9:
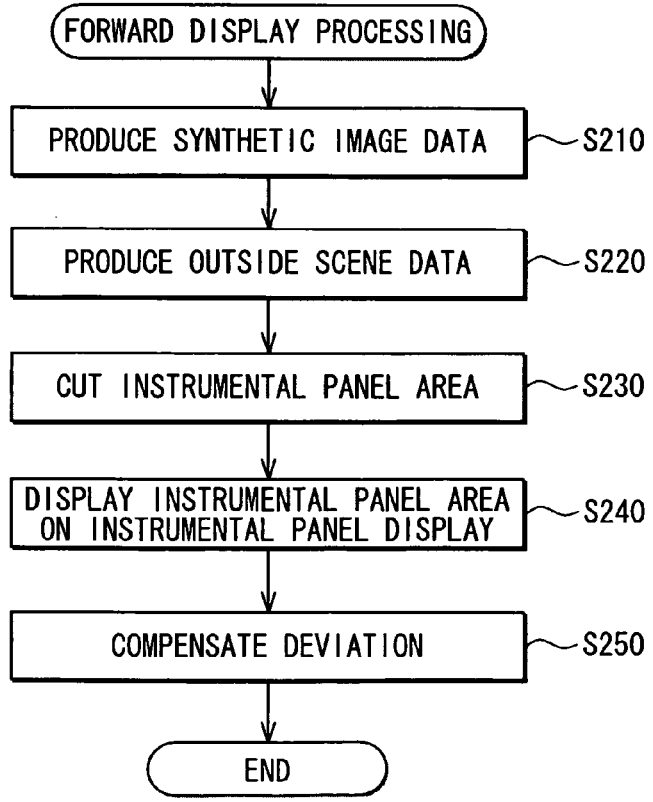
FIG. 9 is a flowchart illustrating exemplary forward display processing.
Figure 10:
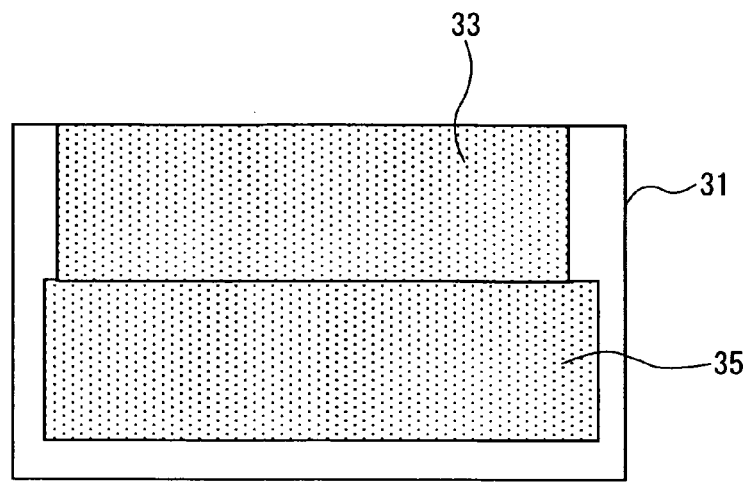
FIG. 10 is a diagram illustrating exemplary cutting of a portion displayed on an instrument panel display from synthetic image data.
Figure 11:
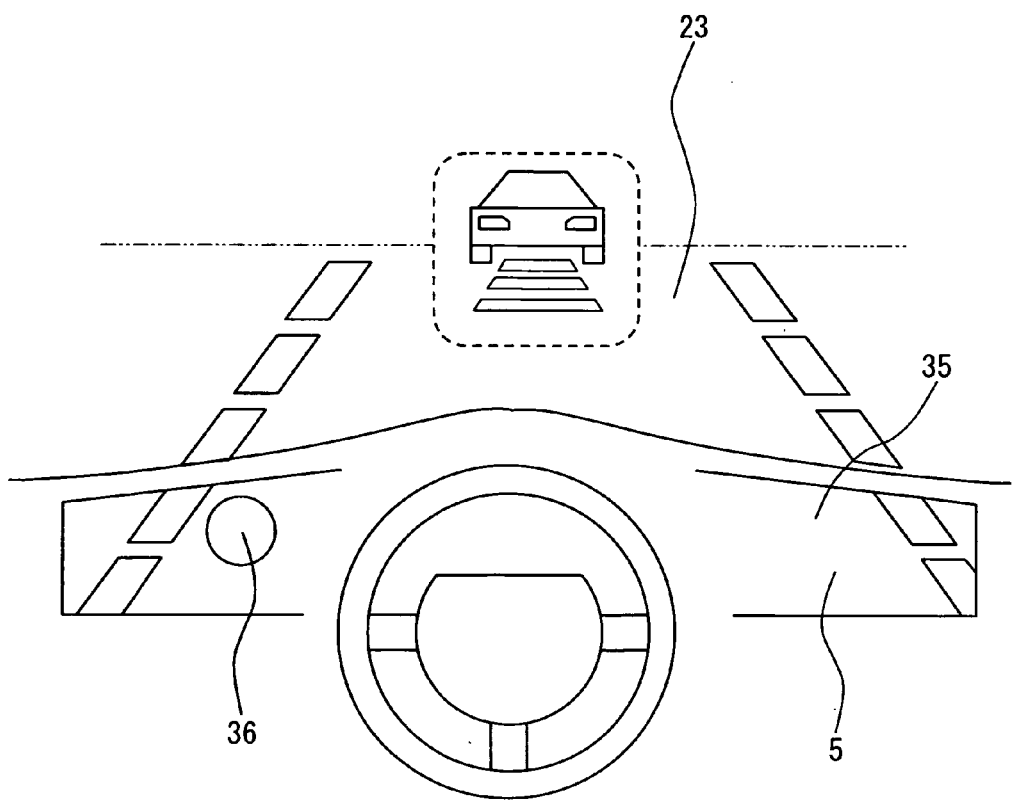
FIG. 11 is a diagram illustrating an exemplary display of an image of a scene in front of a vehicle on an instrument panel display.

Forward display processing will be described hereafter in conjunction with FIG. 9 to FIG. 11. FIG. 9 is a flowchart describing forward display processing. At S210, the cameras 7a to 7f that image forward ranges are used to acquire images which express a scene in front of the vehicle 21. Image data items produced by the cameras are synthesized to produce one image data that represents a wide range in front of the vehicle 21. The image data hereinafter can be referred to as synthetic image data. As a synthesis method for producing the synthetic image data, a known image synthesis method, for example, a method described in JP-A-2002-354468 or JP-A-2002-354468 may be adopted. Moreover, for production of the synthetic image data, a distortion should preferably be eliminated. As a method of eliminating a distortion, a known method, for example, a method described in JP-A-2003-235036 may be adopted.

At S220, the internal imaging camera 15 is used to produce image data representing an outside scene viewed through the windshield 23. The image data shall hereinafter be called outside scene data.

At S230, a portion to be displayed on the instrument panel display 5 is cut out of the synthetic image data produced at S210. The processing associated with cutting out the portion from the synthetic image data will be described in conjunction with FIG. 10. A portion 33 of the synthetic image data 31, which is produced at S210, corresponding to the outside scene data produced at S220 is discriminated. A portion of the synthetic image data that would lie on the instrument panel display 5, supposing the portion 33 corresponding to the outside scene data were placed on the windshield 23, is cut out. The portion shall hereinafter be called an instrument panel area 35. The size of the instrument panel area 35 is the same as the size of the instrument panel display 5.

At S240, the instrument panel area 35 is displayed on the instrument panel display 5. FIG. 11 shows the state of the instrument panel display 5 on which the instrument panel area 35 is displayed. The contents of display on the instrument panel display 5 refer to an outside scene that would be viewed at the position of the instrument panel display 5 supposing the vehicle 21 were transparent. The displayed scene is seamlessly linked to the scene viewed through the windshield 23. The meter 36 is displayed on the instrument panel display 5 while being superimposed on the outside scene. The position of the meter 36 can be shifted on the instrument panel display 5 according to an input sent from the mouse 9.

At S250, the internal imaging camera 15 is used to acquire an image containing both the outside scene viewed through the windshield 23 and an image displayed on the instrument panel display 5. A known method, for example, a method described in JP-A-2006-74805 is used to compensate a deviation of the image displayed on the instrument panel display 5 from the scene viewed through the windshield 23.

Figure 12A:
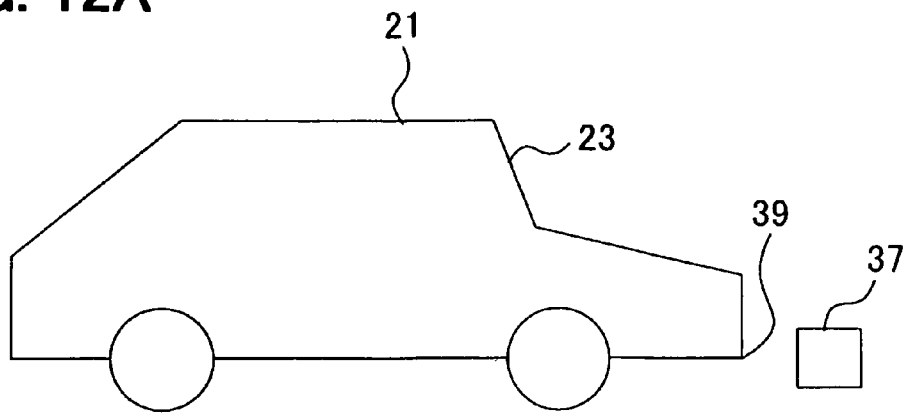
FIG. 12A is a diagram illustrating an exemplary positional relationship between a vehicle and an obstacle.
Figure 12B:
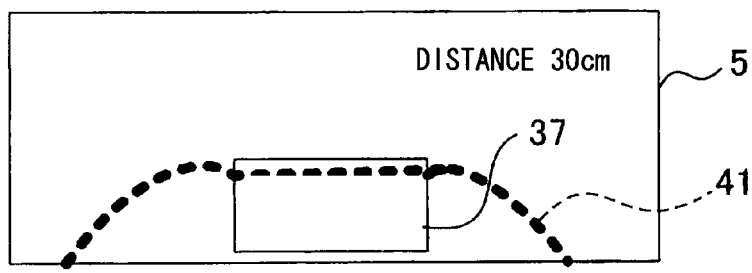
FIG. 12B is a diagram illustrating an exemplary display form supported by the instrument panel display when an obstacle is located near a vehicle.

Next, vibration detection time display processing and obstacle detection time display processing will be described below. The pieces of processing are fundamentally identical to the aforesaid forward display processing. However, in the vibration detection time display processing, processing similar to the forward display processing is repeatedly executed until a predetermined time elapses since detection of a vibration, and display persists. Moreover, in the obstacle detection time display processing, the processing similar to the forward display processing is repeatedly executed while an obstacle is detected, and display persists. In the obstacle detection time display processing, a distance to an obstacle and the contour 41 of the vehicle 21 are displayed on the instrument panel display 5 while being superimposed on the scene in front of the vehicle. For example, assuming that a tricycle 37 lies, as shown in FIG. 12A, in front of the vehicle, a distance between the front end 39 of the vehicle 21 and the tricycle 37 is, as shown in FIG. 12B, displayed on the instrument panel display 5. The distance is calculated based on an image acquired by the camera group 7 according to a known distance calculation method. As the distance calculation method, there is, for example, a method disclosed in JP-A-2005-196276. Specifically, an image acquired by one camera included in the camera group 7 is regarded as a reference image, and an image acquired by any other camera is regarded as a comparative image. An aberration is calculated based on the reference image and comparative image. The aberration, which can be considered a magnitude of deviation of the comparative image from a reference image in a horizontal direction, is used to obtain distance information concerning an entire image according to the principles of trigonometric survey, and three-dimensional distance distribution data or a distance image is produced. The distance distribution data is processed in order to detect three-dimensional objects that might lie forward of the vehicle along a driving course or direction, such as a preceding automobile, a stopped vehicle, an opposite vehicle, a pedestrian, an electrical pole, a house, or the like, and to recognize the shape of a road. For recognition of a three-dimensional object, for example, an edge of the object in a horizontal direction and an edge of the object in a vertical direction are extracted from an image. Further, the contour 41 of the vehicle 21 viewed from the perspective of a driver is displayed on the instrument panel display 5. The data of the contour 41 is stored in advance in the control device 3.

Figure 12C:
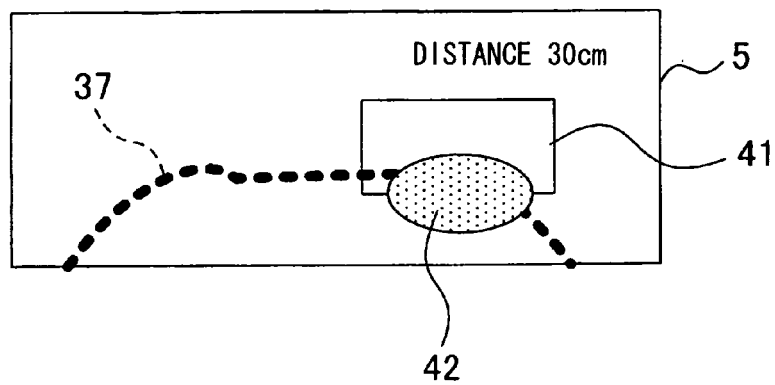
FIG. 12C is a diagram illustrating an alternative exemplary display form supported by the instrument panel display when an obstacle is located near a vehicle.

When the vehicle 21 and the tricycle 37 are in danger of colliding with each other, for example for example, in a first situation when the distance A between the front end 39 of the vehicle 21 and the tricycle 37 is less than or equal to a predetermined value, for example, 50 cm, or in a second situation when a value A/B is less than or equal to a predetermined value on the assumption that B denotes a relative approaching speed between the vehicle 21 and tricycle 37, the control device 3 gives warning. As for the warning, the display of the distance on the instrument panel display 5 may be, as shown in FIG. 12C, magnified, a place 42 where collision is likely to occur may be highlighted on the instrument panel display 5, or the audio output device 11 and loudspeaker 12, as shown in FIG. 1, may be used to give an alarm sound.

Figure 13:
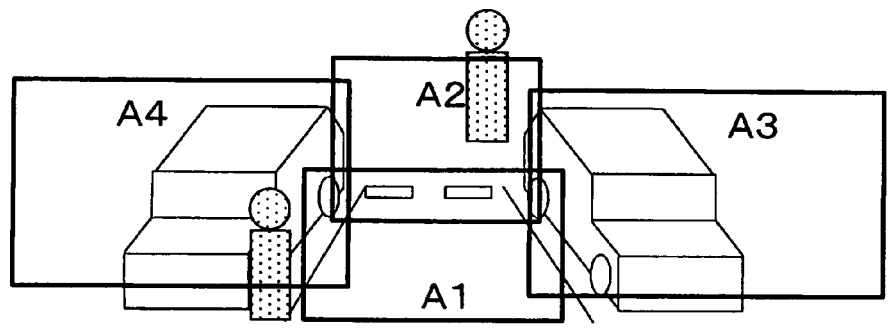
FIG. 13 is a diagram illustrating a range behind a vehicle and a positional relationship between images acquired by exemplary cameras.
Figure 14:
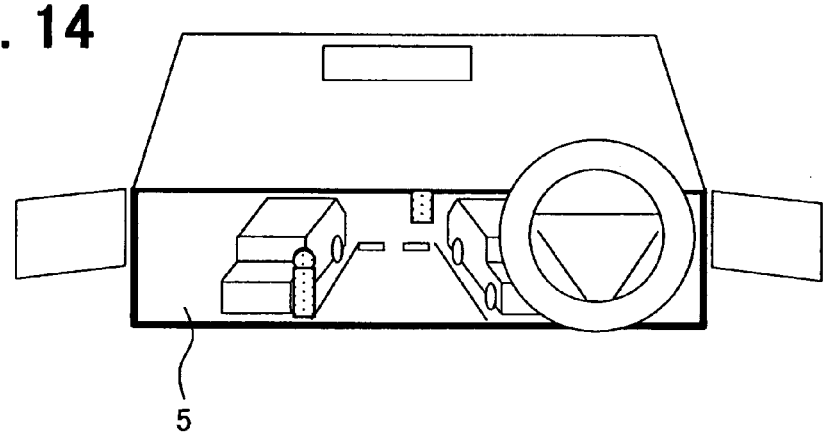
FIG. 14 is a diagram illustrating a state of an instrument panel display on which an image of a scene behind a vehicle is displayed.

Next, backward display processing will be described in conjunction with FIG. 13 to FIG. 16. In the backward display processing, first, the cameras 7g, 7h, 7i, 7m, 7p, and 7h are used to acquire images of a range behind the vehicle 21. As shown in FIG. 13, an image A1 acquired by the camera 7h, an image A2 acquired by the camera 7g, an image acquired by the cameras 7j and 7m, and an image A4 acquired by the cameras 7p and 7h overlap and cover a wide range as a whole. Thereafter, the images A1 to A4 are synthesized in order to produce one image data that can be referred to hereinafter as backward synthetic image data. The backward synthetic image data is, as shown in FIG. 14, displayed on the instrument panel display 5. The image synthesis method is identical to that employed in the forward display processing. Incidentally, the backward synthetic image data is displayed on the instrument panel display 5 in a right-and-left inverted manner. Consequently, since the right and left in the backward synthetic image correspond to those in the views on rearview mirrors, a driver can intuitively understand the backward situation.

Figure 15:
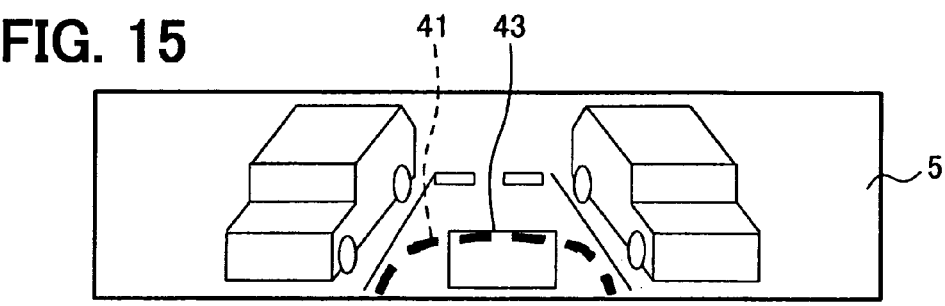
FIG. 15 is a diagram illustrating an alternate state of an instrument panel display on which an image of a scene behind a vehicle is displayed.

Moreover, as shown in FIG. 15, the contour 41 expressing the back end of the vehicle 21 is displayed on the instrument panel display 5 while being superimposed on the backward synthetic image data. When the distance between an obstacle 43 and the back end of the vehicle 21 becomes less than or equal to a predetermined value, the audio output device 11 and loudspeaker 12, as shown in FIG. 1, are used to give audio warning, for example, an audio output saying "There is an obstacle behind the vehicle. Stop the vehicle." The calculation method for the distance between the obstacle 43 and vehicle 21 is identical to that employed in the obstacle detection time display processing. The data of the contour 41 is stored in advance in the control device 3.

Figure 16:
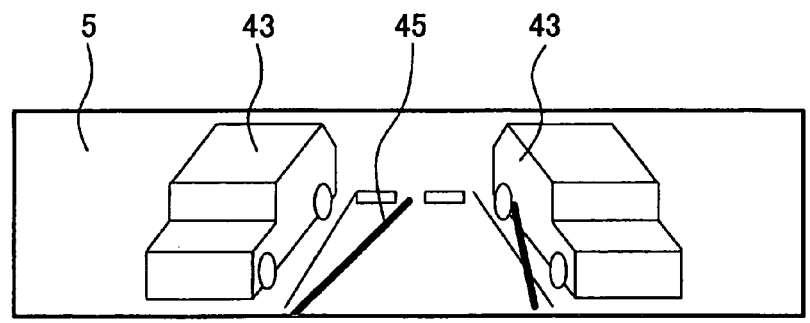
FIG. 16 is a diagram illustrating an alternate state of an instrument panel display on which an image of a scene behind a vehicle is displayed.

As shown in FIG. 16, guide lines 45 indicating the advancing direction of the vehicle 21 are displayed on the instrument panel display 5 while being superimposed on the backward synthetic image data. The orientation of the guide lines 45 is calculated based on the angle of the steering wheel of the vehicle 21. The obstacle 43 is detected from the backward synthetic image data. When a decision is made based on the orientation of the guide lines 45 and the position of the obstacle 43 that further backing will lead to collision, the audio output device 11 and loudspeaker 12 as shown, for example, in FIG. 1, are used to give audio warning, for example, an audio output saying "Further backing will lead to collision. Turn the steering wheel counterclockwise."

The display system 1 can display on the instrument panel display 5 a range that becomes obstructed due to the body of the vehicle 21. Consequently, a driver can recognize an obstacle lying in the blind spot and prevent contact or collision with the obstacle. Moreover, since the display on the instrument panel display 5 is seamlessly linked to a scene viewed through the windshield 23, the driver can more intuitively recognize the obstacle.

When the velocity of the vehicle 21 is greater than or equal to 30 km, the display system 1 does not display an outside scene on the instrument panel display 5 providing a power saving advantage.

When detecting an obstacle, the display system 1 displays on the instrument panel display 5 a distance from the vehicle 21 to the obstacle. Moreover, the contour 41 of the vehicle 21 is displayed. When there is a fear that the vehicle 21 may collide against the obstacle, warning is given. Consequently, the collision of the vehicle 21 against the obstacle can be more effectively prevented.

When the vehicle 21 is backed, the display system 1 can display on the instrument panel display 5 a scene behind the vehicle 21. Moreover, since an image produced by synthesizing images acquired by multiple cameras is displayed, the scene behind the vehicle 21 can be displayed over a wide range, and a driver can intuitively recognize a backward situation. Moreover, since the image of the backward scene displayed on the instrument panel display 5 has the right and left thereof inverted, the right and left of the image correspond to those of views on the rearview mirrors and side mirrors. The driver can easily perform a backing operation as if he/she were driving while looking backward.

Even when the velocity of the vehicle 21 is greater than or equal to 30 km, if the display system 1 detects a vibration or an obstacle, the display system 1 displays a scene in front of the vehicle on the instrument panel display 5. Consequently, a driver can recognize the cause of the vibration or the obstacle and can perform an appropriate driving operation. When the gear is shifted from the drive (D)-mode position to the reverse (R)-mode position, the display system 1 brings the instrument panel display 5 to a non-display state advantageously providing a power saving.

In accordance with the various embodiments discussed and described herein, an article of manufacture is provided in the form of a computer readable medium having instructions thereon, such as a computer software program, including an application program, an embedded program object, or any executable object, which, when read, are capable of causing a processor, controller, or the like to operate in a certain manner. The computer readable medium can be an internal or external memory device of any kind, whether integrated into the processor or external to the processor provided that the medium is capable of being read by the processor, control or the like, and can include a removable medium such as an optical or magnetic disk, memory stick, or the like. The computer readable medium can also include a communication channel of any kind that is capable of transferring computer instructions. For simplicity, a detailed description of the program itself will not be included, however it will be appreciated that the program instructions will cause a processor, controller or the like to function as various means described herein in terms of the functions that are carried out by the described means.

It should be noted that the present invention is not limited to the above described embodiments. Needless to say, the present invention can be implemented in various modes without a departure from the gist of the invention.

Figure 17:
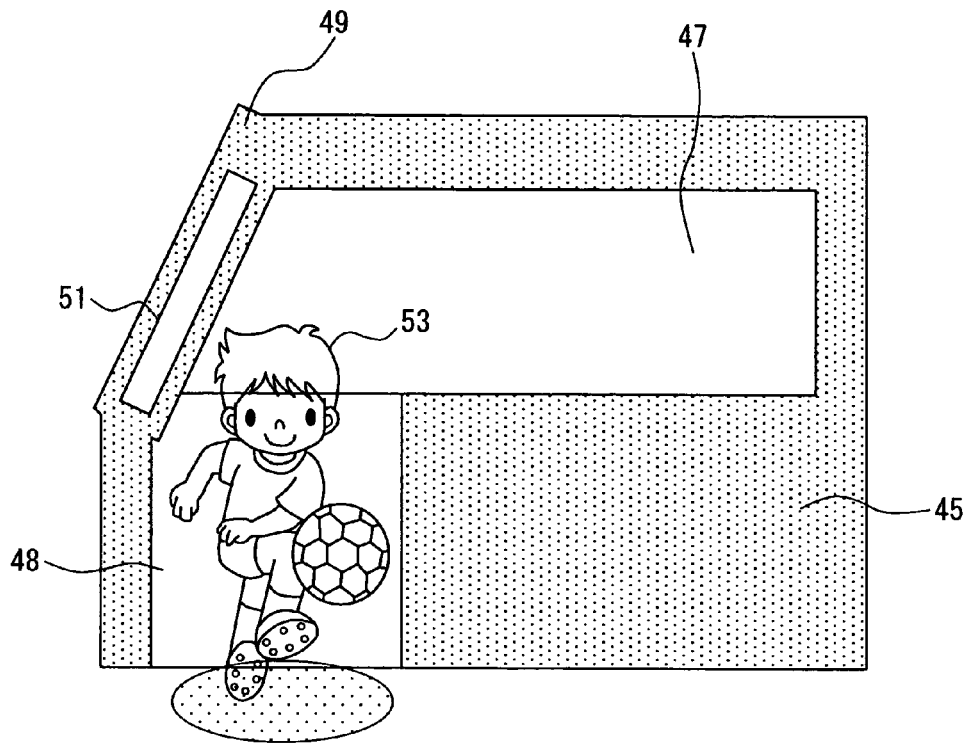
FIG. 17 is a diagram illustrating a display disposed on an internal surface of a flank of a vehicle.

For example, as shown in FIG. 17, a lateral display 48 may be disposed below a side window 47 on the internal side of a door 45 located on the flank of the vehicle 21, and a pillar display 51 may be disposed on the internal side of a pillar 49. Images of a lateral range acquired by the cameras 7i to 7p may be synthesized in order to produce one image data representing the lateral range on the lateral side of the vehicle 21. Image data items associated with the positions of the lateral display 49 and pillar display 51 respectively are cut out of the image data. The cut image data items may be displayed on the lateral display 49 and pillar display 51 respectively. Image synthesis, cutting, and display of a cut image can be performed in the same manner as those in the forward display processing. The contents of display on the lateral display 49 or pillar display 51 refer to an outside scene that would be viewed at the position of the lateral display 49 or pillar display 51 supposing the vehicle 21 were transparent, and are seamlessly linked to a scene viewed through the side window 47. The displays on the lateral display 49 and pillar display 51 may be achieved during forward display processing, backward display processing, or both forward and backward display processing.

When the foregoing components are included safety can be increased. For example, even if a child 53 lies near the flank of the vehicle 21, as shown in FIG. 17, the driver can discern the child 53 through the lateral display 48 or pillar display 51.

Figure 18:
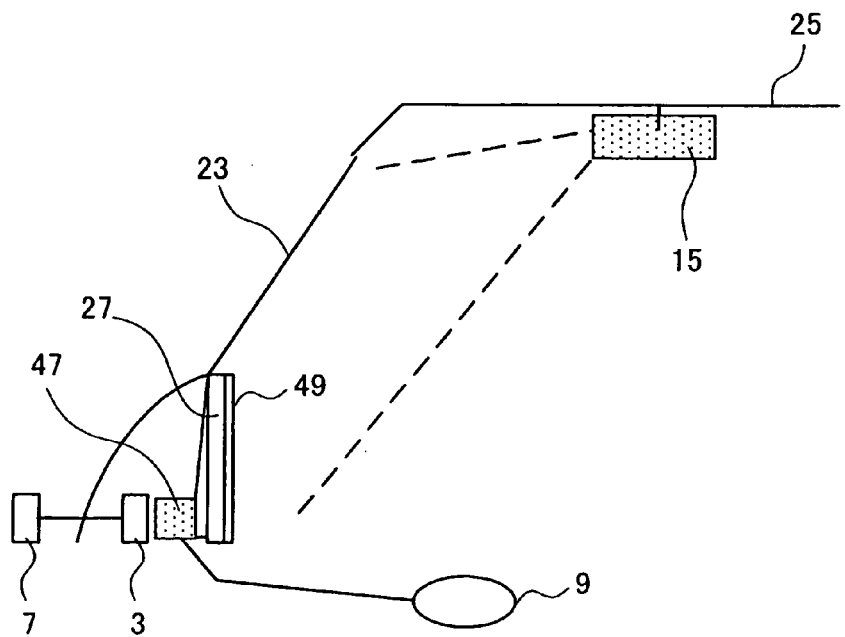
FIG. 18 is a diagram illustrating an exemplary configuration of an embodiment including a rear projector and a screen.

The instrument panel display 5 may include, as shown in FIG. 18, a rear projector 47 placed on the rear part of the instrument panel 27, and a screen 49 which is placed on the surface of the instrument panel 27 and on which light emitted from the rear projector 47 is projected.

The timing of executing the forward display processing or backward display processing may be any timing, and the forward display processing or backward display processing may be executed according to an operation performed by the driver. For example, when the vehicle is driven at a high velocity, if the velocity is rapidly decreased due to a forward traffic jam, the backward display processing may be automatically executed or executed in response to an instruction given by the driver. In such a case, the driver can discern approach of any other vehicle being driven backward, and prevent contact or collision with the vehicle.

In addition to the above described alternatives, additional embodiments may be included. For example, when the forward display processing, backward display processing, vibration detection time display processing, or obstacle detection time display processing is executed, the entire surface of the instrument panel display 5 may not be used but part of the entire surface, for example, the right half thereof or the left half thereof may be employed. Moreover, for example, entire-surface display and partial-surface display may be switched according to a manipulation performed by a driver. Further, detection of an obstacle and calculation of a distance between the obstacle and a vehicle may be performed using a millimeter-wave radar.

What is claimed is:

1. A display system comprising:
   a first imaging means for acquiring a first image of a scene associated with an outside of a vehicle, the scene including a range that becomes obstructed when viewed from a driver seat of the vehicle;
   a first display means disposed on an instrument panel of the vehicle, the first display means displaying the first image;
   a second imaging means disposed inside of the vehicle for acquiring a second image containing both an outside scene viewed through the windshield and an image displayed on the first display means;
   a vibration detection means for detecting a vibration of the vehicle; and
   a control means for displaying the first image and the second image seamlessly on the first display means when the vibration detection means detects the vibration of the vehicle.

2. The display system according to claim 1, further comprising a gear detection means for detecting a gear state of the vehicle, wherein the control means changes a form of the display on the first display means from one to another according to the gear state.

3. The display system according to claim 1, further comprising a velocity detection means for detecting a velocity of the vehicle, wherein the control means changes a form of the display on the first display means from one to another according to the result of the detection performed by the velocity detection means.

4. The display system according to claim 1, further comprising an obstacle detection means for detecting an obstacle in an area surrounding the vehicle, wherein when the obstacle detection means detects an obstacle a notification is provided.

5. The display system according to claim 4, further comprising a distance calculation means for calculating a distance between an obstacle detected by the obstacle detection means and the vehicle, wherein the distance is displayed on the first display means.

6. The display system according to claim 1, wherein:
the range that becomes obstructed includes a range behind the vehicle; and
the control means switches the image displayed on the first display means from the image seamlessly linked to a scene viewed through the windshield, and an image of the range behind the vehicle.

7. The display system according to claim 1, wherein
the control means switches the first display means from displaying no scene, to seamlessly displaying the first image and second image on the first display means, when the vibration of the vehicle is detected by the vibration detection means.

8. The display system according to claim 1, wherein
the control means switches the first display means from seamlessly displaying the composite first image and second image on the first display means, to displaying no scene or an image different from the seamlessly displayed composite first image and second image, when a pre-determined time elapses after detecting the vibration of the vehicle.

9. The display system according to claim 1, wherein
the control means switches the first display means from displaying one of (i) no scene, (2) a forward image from forward display processing, and (3) a backward image from backward display processing, to displaying the seamlessly displayed composite first image and second image, when the vibration of the vehicle is detected by the vibration detection means, the forward image and backward image being different from the seamlessly displayed composite first image and second image; and
the control means reverts the first display means from displaying the seamlessly displayed first image and second image, to one of the no scene, the forward image and the backward image, when a pre-determined time elapses after the vibration of the vehicle is detected.

* * * * *